(12) United States Patent
Kolb

(10) Patent No.: US 7,674,371 B2
(45) Date of Patent: Mar. 9, 2010

(54) WASTE WATER INSTALLATION WITH PURIFICATION DEVICE

(76) Inventor: Frank Rainer Kolb, Parkstrasse 20, 65232 Taunusstein (DE)

( * ) Notice: Subject to any disclaimer, the term of this patent is extended or adjusted under 35 U.S.C. 154(b) by 547 days.

(21) Appl. No.: 10/469,635

(22) PCT Filed: Mar. 5, 2002

(86) PCT No.: PCT/EP02/02388

§ 371 (c)(1),
(2), (4) Date: Mar. 3, 2004

(87) PCT Pub. No.: WO02/077379

PCT Pub. Date: Oct. 3, 2002

(65) Prior Publication Data

US 2004/0134843 A1    Jul. 15, 2004

(30) Foreign Application Priority Data

Mar. 7, 2001 (DE) ............................. 201 03 875 U

(51) Int. Cl.
*E02B 5/08* (2006.01)
(52) U.S. Cl. .................. 210/109; 210/116; 210/155; 210/156; 210/159
(58) Field of Classification Search .................. 210/158, 210/159
See application file for complete search history.

(56) References Cited

U.S. PATENT DOCUMENTS

| | | |
|---|---|---|
| 799,829 A | 9/1905 | Church |
| 909,484 A | 1/1909 | Auken |
| 1,035,480 A | 8/1912 | Schodde |
| 1,474,938 A | 11/1923 | Marsh |
| 1,758,743 A | 5/1930 | Harman |
| 1,825,169 A | 9/1931 | Wyckoff |
| 2,672,982 A * | 3/1954 | Way ........................... 210/155 |
| 4,134,833 A | 1/1979 | McCormick |
| 4,415,462 A * | 11/1983 | Finch et al. .................. 210/767 |
| 4,689,145 A | 8/1987 | Mathews et al. |
| 5,277,799 A | 1/1994 | Bransch |
| 5,490,922 A * | 2/1996 | Gresa ......................... 210/159 |

(Continued)

FOREIGN PATENT DOCUMENTS

CH    692 156 A5 *    2/2002

(Continued)

OTHER PUBLICATIONS

Definitions of the word "component" downloaded from Dictionary.com on May 7, 2009, 1 page.*

(Continued)

*Primary Examiner*—Robert James Popovics
(74) *Attorney, Agent, or Firm*—Dority & Manning, P.A.

(57) ABSTRACT

In waste water installations, the amount of falling rainwater which increases as a result of heavy precipitations is diverted into lakes and waterways in order to relieve the sewage treatment plant. In order to remove the impurities carried along with the rainwater, the water is purified using a purification device. A retaining element is disposed behind the purification device in the direction of flow. This element is at least partially detachable connected to a base surface and can be used to release the through-flow in the region of the base surface of the purification device in an intermittent manner. The retaining element is pivotable around an axis.

17 Claims, 4 Drawing Sheets

U.S. PATENT DOCUMENTS

| | | | | |
|---|---|---|---|---|
| 5,788,848 | A * | 8/1998 | Blanche et al. | 210/162 |
| 6,086,756 | A * | 7/2000 | Roy | 210/155 |
| 6,190,545 | B1 * | 2/2001 | Williamson | 210/155 |
| 6,241,881 | B1 * | 6/2001 | Pezzaniti | 210/155 |
| 6,281,597 | B1 * | 8/2001 | Obermeyer et al. | 290/54 |
| 6,464,862 | B2 * | 10/2002 | Bennett | 210/155 |
| 6,478,954 | B1 * | 11/2002 | Turner et al. | 210/162 |
| 6,511,595 | B2 * | 1/2003 | Crompton et al. | 210/162 |
| 6,641,720 | B1 * | 11/2003 | Crompton et al. | 210/155 |
| 6,679,994 | B1 * | 1/2004 | Turco et al. | 210/767 |
| 6,705,049 | B2 * | 3/2004 | Esmond et al. | 52/16 |
| 6,821,445 | B2 * | 11/2004 | Miyata et al. | 210/793 |
| 6,936,164 | B2 * | 8/2005 | Wade | 210/162 |
| 6,953,529 | B2 * | 10/2005 | Weir | 210/791 |
| 6,991,114 | B2 * | 1/2006 | Allen et al. | 210/519 |
| 7,022,243 | B2 * | 4/2006 | Bryant | 210/747 |
| 2003/0121846 | A1 * | 7/2003 | Use et al. | 210/521 |
| 2003/0121847 | A1 * | 7/2003 | Joseph et al. | 210/521 |
| 2003/0121848 | A1 * | 7/2003 | Use et al. | 210/521 |
| 2003/0121849 | A1 * | 7/2003 | Use et al. | 210/521 |
| 2003/0121850 | A1 * | 7/2003 | Use et al. | 210/521 |
| 2003/0164341 | A1 * | 9/2003 | Use et al. | 210/776 |
| 2003/0173277 | A1 * | 9/2003 | Shaw et al. | 210/163 |
| 2004/0134843 | A1 * | 7/2004 | Kolb | 210/158 |
| 2005/0006320 | A1 * | 1/2005 | Use et al. | 210/791 |
| 2005/0246967 | A1 * | 11/2005 | Esmond et al. | 52/16 |

FOREIGN PATENT DOCUMENTS

| | | |
|---|---|---|
| DE | 2743580 | 3/1979 |
| DE | 3305409 A1 | 8/1984 |
| DE | 3928681 A1 * | 4/1990 |
| DE | 4031479 A1 * | 6/1991 |
| DE | 41 24 006 A1 | 3/1992 |
| EP | 0358952 B1 | 3/1990 |
| EP | 565483 A1 * | 10/1993 |
| EP | 690179 A1 * | 1/1996 |
| EP | 0709529 | 5/1996 |
| EP | 1039052 B1 | 9/2000 |
| FR | 2744147 | 8/1997 |
| GB | 487803 | 6/1938 |
| GB | 2277 953 A * | 11/1994 |
| GB | 2277460 A * | 11/1994 |
| WO | 9221837 | 12/1992 |

OTHER PUBLICATIONS

PCT Search Report, Jul. 18, 2002.

* cited by examiner

WASTE WATER INSTALLATION WITH PURIFICATION DEVICE

BACKGROUND

The invention is relative to a waste-water installation with an inflow side for contaminated water and an outflow side for cleaned water and a cleaning device arranged between them for retaining or separating impurities delivered on the inflow side, and with a damming element arranged after the cleaning device. Such waste-water installations are used to drain off the increased amount of rainwater that accumulates during rather heavy precipitations since it can no longer be managed, e.g., by a sewage treatment plant. However, the increased amount of accumulating rainwater is mixed with contaminated water, so that it is contaminated with suspended material, e.g., pieces of wood, sand, paper or plastic foils. These contaminants (impurities) are removed or retained from the rainwater and diverted, e.g., into a body of water, by such waste-water installations by means of a cleaning device, e.g. a sieve (screen) rake. The above-mentioned cleaning device is arranged between the inflow area of the waste water and the outflow area from which the rainwater drained off for removal of the load (relief) is conducted away. Such a device is known from WO 94/07585.

The device shown in this document comprises an intermediate wall between the inflow side and the outflow side, on which wall a cleaning device in the form of a sieve rake is arranged. In addition to the action of the intermediate wall, a damming element inclined to the vertical plate is provided in the direction of flow behind the sieve rake in order to increase the damming volume of retained water upstream of the sieve rake. This arrangement should help to even out the flowthrough rate of the water through the sieve rake and obtain a more uniform distribution of pressure over the entire surface of the sieve rake. However, the device shown has the disadvantage that in particular suspended material and sinking (settling) material such as, e.g., sand, can not overcome the inclined damming element so that they remain in the area of the sieve rake and cause problems there, especially for the rake cleaner. The remaining sinking material causes increased wear between the sieve rake and the rake cleaner. In addition, the damming element does increase the retention capacity of the waste-water installation, but if the damming element is flooded, the damming element forms a throttling device so that the flowthrough amount through the rake is reduced and there is the danger that the sieve rake is flooded above its upper edge, as a result of which unpurified water is removed.

The present invention aims to avoid the cited disadvantages of the known waste-water installations and also not to hinder the flowthrough through the cleaning device of the waste-water installation in spite of the elevation of the damming volume.

SUMMARY

Objects and advantages of the invention will be set forth in part in the following description, or may be obvious from the description, or may be learned through practice of the invention.

The fact that the damming element in embodiments of the invention is connected at least in a partially detachable manner in the area of the bottom area with this bottom area makes it possible to produce an interval between the bottom area and the damming element so that water can flow through in this area. As a consequence thereof, a flow is produced in the area of the bottom area or the rate of flow rises there significantly so that settled sinking material can be removed. This material thus also passes out of the area of the cleaning device, where it can result in increased wear or problems in the cleaning device. All this is made possible by the fact that the damming element is movably supported and therefore at least a periodic release of the flowthrough in the area of the bottom area can be made possible. If the damming element is designed so that it communicates in the area of the bottom area in a detachable manner with the bottom area, a damming up of water in the waste-water installation can be achieved with the damming element in accordance with the invention even at a relatively low water element, and it can be assured at the same time that the disadvantages of a backup, e.g., the settling (depositing) of sinking material or the reduction of the cross section of the flow are eliminated with the device of the present invention.

With an especially advantageous embodiment, the damming element is designed in a multi-part fashion, which makes it possible, e.g., to design only a narrow area of the damming element to be movable, especially in the area of the bottom area, whereas the remaining part of the damming element is installed in a fixed manner. This can make a good damming-up (backup) possible and at the same time the device can be designed to be economical. Even though the damming element can be designed to be substantially simple therewith, it can be designed to be stable and light at the same time and also to be fixed in a simple manner in the waste-water installation.

The dividing of the damming element into several individual components can take place not only in a horizontal direction, but also vertically.

In an advantageous further development of the invention, the damming element is shiftably mounted, as a result of which it can be favorably designed in accordance with space conditions or for utilizing special driving means of the damming element. In an especially favorable embodiment of the invention the damming element is mounted so that it can pivot about a shaft (axis). This makes an especially reliable fastening possible and brings it about at the same time that the requirements of the invention are made possible with the aid of a simple form of movement. Moreover, it is possible, given a pivotable support, to make the drive for adjusting the damming element possible simply in that the water backing up on the damming element presses on a surface of the damming element and as a result moves the latter in a manner in accordance with the invention.

The designing of the shaft (axis) as a substantially horizontal shaft or, depending on the design of the bottom area, also as a shaft running parallel to the bottom area is especially advantageous. The advantages of the invention can be achieved in particular in a simple manner in that the swivel axis is at an interval from the bottom area so that as a result of the pivoting movement about this swivel (pivoting) axis, the area of the bottom area can be freed from the damming element, during which the flow pressure of the dammed-up water, or its flow, frees the bottom area from sinking material in accordance with the invention.

In an especially advantageous further development of the invention, the damming element is designed in a multi-part manner. One division of the damming element can take place in a horizontal direction as well as in a vertical direction. A division of the damming element into partial surfaces makes it possible that, e.g., only the area in the vicinity of the bottom area is dammed up by a movable damming element whereas the area above it is dammed up by a damming element mounted in a fixed manner. As a result, it is economical to manufacture the damming element with its damming action.

In order to make a cleaning of sinking material possible, it is not necessary to design the entire damming element to be movable but it is frequently sufficient to design only the area of the damming element between the swivel axis and the bottom area to be movable. In an advantageous alternative embodiment, the swivel axis about which the damming element is moveably mounted can be arranged on the side edge of the damming element, that is, substantially running in a vertical direction. As a result, the movement of the damming element takes place similar to that of a door or flap. This embodiment can be especially advantageous for the maintenance and cleaning of the cleaning device of the waste-water installation.

The advantageous design of the waste-water installation in which the damming element is arranged at an interval from the cleaning device results in sufficient space for a freedom of movement for the moving of the damming element. This has the additional advantage that a settling of sinking material can take place in the area between the cleaning device and the damming element so that the sinking material passes reliably out of the area of the cleaning device and therewith out of the area in which wear is possible. A collection area for the sinking material is created by this design.

In an especially advantageous embodiment, the damming element is pivoted about a swivel axis during the movement of the damming element, during which the part of the damming element located under the swivel axis moves in the direction of the cleaning device. This brings it about that the water backed up at least to the level of the swivel axis presses in such a manner on the damming element that the latter is reliably sealed, and that in this manner a sufficient damming up of the water in the waste-water installation is achieved. A movement away from the cleaning element is also advantageously possible if a sufficient seal is assured elsewhere.

In an especially advantageous embodiment of the invention, the damming element is constructed from a metallic material and designed as a flap. A flap can be opened in an especially simple manner by the flowing medium so that the action of the movable damming element, namely, e.g., the increased flowthrough or the cleaning of sinking material, is made possible in an especially simple manner. The design of the waste-water installation in accordance with the invention and with a collection area between the cleaning device and the damming element brings it about in a reliable manner that the sinking material and suspended material can be deposited in a sufficient amount before they can result in problems in the cleaning device. Accordingly, the damming element advantageously also comprises a cleaning position that is specially set up so that in particular the collection area receives an especially vigorous flowthrough, independently of the other flowthrough properties of the waste-water installation, and is quite thoroughly cleaned as a result thereof.

In an especially advantageous further development of the invention, a control device is provided that controls the damming element, e.g., via a drive device, in such a manner that a reduction of the damming action of the damming element is achieved as desired as a function of the level of the accumulating amount of water. It can be provided that the control device also comprises sensors that make possible a regulating of the liquid level and of the flowthrough rate of the backed-up water.

In an advantageous further development of the invention, the damming element is equipped with a guide device that makes it possible to hold the damming element in a position, by utilizing the properties of the dammed-up or already flowing water, in which position it is pivoted about the swivel axis so that the cleaning action and the control of the flowthrough can be carried out. Thus, no additional provision of outside energy or of control devices or of regulating devices need be made. The guide device can be designed with advantage, e.g., as a type of carrier surface, that makes possible a lifting of the pivoted damming element so that its intrinsic weight, e.g., is not used to pivot the damming element back and thus interrupt the flowthrough between the damming device and the bottom area.

An especially advantageous embodiment of the invention provides that the damming element is arranged at least partially in the plane of the bottom area or below it. This brings it about that the part of the damming element, e.g., a partial surface, that is movably mounted removes the water already in the area of the bottom area and that deposited sinking material need only traverse a short path for removal. It is especially simple to fasten and support a shaft in the area of the bottom area because the bottom area forms a stabile support for the shaft of the pivotably mounted damming element. In an advantageous embodiment of the invention, the shaft runs substantially vertical relative to the cleaning device. This embodiment facilitates the pivoting of the damming element and reduces the influence of the flow on the damming element.

The invention is explained in the following using the drawings.

DETAILED DESCRIPTION

Figure 1:
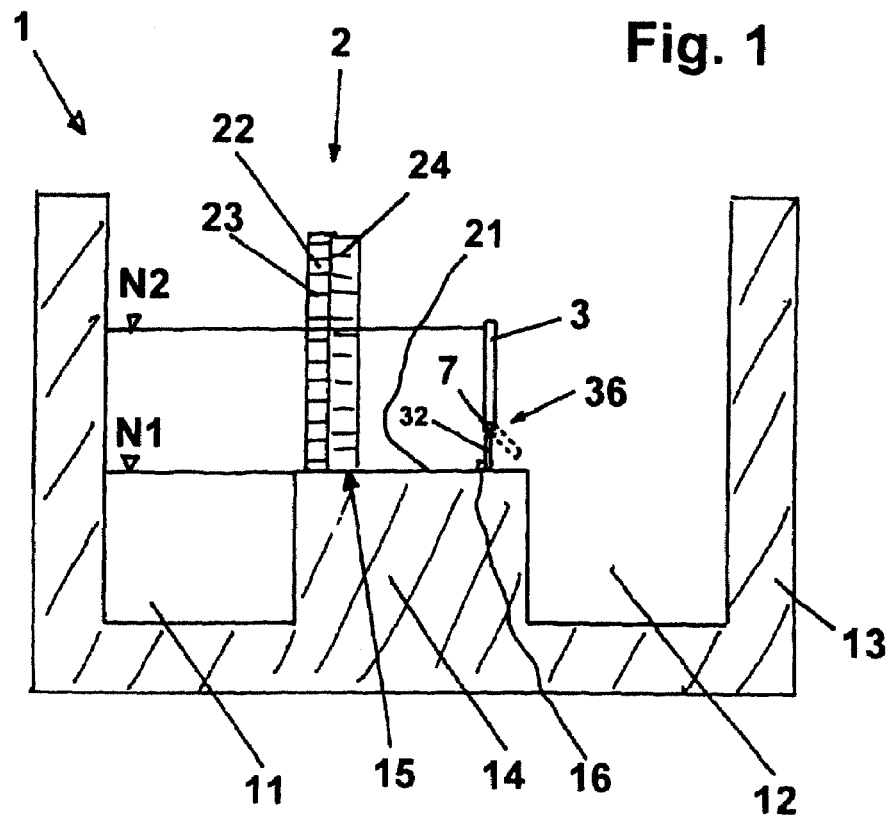
FIG. 1 shows a diagrammatic view of a waste-water installation in accordance with the invention in section.

Reference will now be made in detail to one or more embodiments of the invention, one or more examples of which are shown in the drawings. Each example is provided by way of explanation of the invention, and not meant as a limitation of the invention. It is intended that the invention include modifications and variations to the embodiments illustrated and described herein.

FIG. 1 shows a first exemplary embodiment of waste-water installation 1 in accordance with the invention in a schematic, sectional view. Waste-water installation 1 comprises inflow side 11 and outflow side 12 that are arranged in a so-called relief basin. Inflow side 11 and outflow side 12 are separated from one another by intermediate wall 14. A cleaning device 2 is arranged on the top of intermediate wall 14 on its bottom area 15. Inflow side 11 is connected to an inflow line (not shown) via which rainwater is delivered, e.g., during heavy rain events to waste-water installation 1. The rainwater is mixed thereby without separation with normal waste water and delivered to waste-water installation 1. In the normal instance, the water supplied to inflow side 11, that is, during dry periods and light rainfalls, is conducted out of inflow side 11 to waste-water installation 1 via a conduit connection (not shown) into a sewage treatment plant. Inflow side 11 of relief basin 13 can additionally communicate with a retention basin that assures an at least partial intermediate storage for the increased accumulation of water to be cleaned so that as much of the water as possible supplied via the inflow side of wastewater installation 1 can be delivered to the sewage treatment plant. The retention basin also assures that the accumulation of water to be cleaned in the sewage treatment plant is stretched out in time.

However, if the amount of accumulating water is so great, e.g., during a heavy rain event, that it can not be received by the retention basin and by inflow side 11 of waste-water installation 1, the liquid level in inflow side 11 rises at first until it reaches level N1 of bottom area 15 of intermediate wall 14. A further rise of the liquid on inflow side 11 would, without further measures, have the result that water would pass by the sewage treatment plant into the area of outflow side 12 of waste-water installation 1, from where this water is then discharged, e.g., into a natural body of water.

However, in order to avoid that non-cleaned water passes, e.g., into a natural body of water, cleaning device 2 is arranged between inflow side 11 and outflow side 12. This cleaning device is designed in the exemplary embodiment of FIG. 1 as sieve rake 22, that is capable in a known manner, with rake rods 23 running in parallel and horizontally arranged, of retaining dirt components out of the water flowing through it. In order that sieve rake does not clog up, cleaning device 2 comprises rake cleaner 24, shown only schematically in FIG. 1, with the aid of which the intermediate spaces between rake rods 23 are continuously cleaned and dirt components deposited in front of the rake are removed.

In one exemplary embodiment, as shown in FIG. 1, the dirt removed by rake cleaner 24 from the sieve rake is returned into the waste water located in inflow side 11 since if the water in waste-water installation 1 recedes, this dirt can then be removed by the normal cleaning by the sewage treatment plant. In addition to cleaning device 2, it is also known in the state of the art that a damming element 3 can be provided in the direction of flowthrough after sieve rake 22, that is, between cleaning device 2 and outflow side 12, which damming element 3 is supposed to increase the amount of water retained at first by further damming so that as little water as possible is removed from a cleaning action by the sewage treatment plant.

FIG. 1 shows a damming element 3 in accordance with the present invention. Damming element 3 is capable of damming the backup level of the liquid in inflow side 11 above level N1 backed up by intermediate wall 14 up to level N2 located above level N1. Without the use of a damming element in accordance with the invention, still no water would pass onto outflow side 12 at damming level N2, that corresponds to the level of damming element 3 in FIG. 1. However, according to the present invention, damming element 3 is mounted so that it can move in such a manner that it executes, effected by the forces of the backup pressure by liquid level N2, a pivoting motion about shaft 7. During this time, partial surface 32 of damming element 3 pivots away from cleaning device 2, thus freeing the area between shaft 7 and bottom area 15. The open position of damming element 3 is shown in dotted lines in FIG. 1. The folding back in accordance with the invention of partial surface 32 of damming element 3 brings it about that in the area of bottom area 15 water flows over bottom area 15 at a high rate, thus cleaning bottom area 15. The water flowing underneath shaft 7 passes to outflow side 12 of waste-water installation 1 and leaves it in the direction of, e.g., a natural body of water. The designing of damming element 3 as a multi-part damming element brings it about that the part of the damming element located above shaft 7 continues to dam the water located on the inflow side. As a result, the water on inflow side 11 can continue to be retained for the most part, and nevertheless, due to the designing in accordance with the invention of damming element 3, a current can be produced in the area of bottom area 15 that cleans bottom area 15 of deposits such as, e.g., sand, so that these deposits do not cause any problems in the area of the sieve rake, e.g., during the cooperation of sieve rake 22 with rack cleaner 24.

Basically, the attempt is made to operate the waste-water installation in such a manner that all the accumulating water is removed to the extent possible by the conduit line (not shown) from the area of inflow side 11 in order to clean it in a sewage treatment plant. Consequently, damming element 3 and/or its partial surface 32 is/are advantageously designed so that an opening of the damming element only takes place when an overflowing of damming element 3 on its upper edge 36 takes place in any case by the great accumulation of water on inflow side 11. In order to bring this about, partial surface 32 of damming element 3 can be pre-tensioned with a spring (not shown) in such a manner that the water pressure only succeeds in pivoting partial surface 32 about shaft 7 when a sufficient dammed pressure of the water is present, that is, when the liquid level N2 has been practically reached.

In addition to loading damming element 3 with a spring, it is also possible to assure by skillful distributions of mass on partial surface 32 of damming element 3, which partial surface is located under shaft 7, that a moment is exerted on this partial surface 32 so that it rests in a sealing manner on stop 16. A further elevation of the water level on inflow side 11, e.g., up to over level N2, would then be capable, given the appropriate shaping of the forces acting on partial surface 32, to pivot this partial surface and free therewith the flowthrough of water.

Damming element 3 shown in FIG. 1 is designed in the area of its partial surface 32 as a flap that can pivot about shaft 7, and with the aid of which the effects intended by the invention can be achieved. In addition to a flap pivotable about shaft 7, it is just as possible, in an especially advantageous manner, to design partial surface 32 as an elastically deformable structural component, e.g., in the form of a sealing lip capable by virtue of its deformation of effecting the release of the flowthrough of the liquid in the area of bottom area 15. Given a rather low liquid pressure on the elastically deformable structural component, its deformational return forces bring it about that it rests in a sealing manner on stop 16 of wastewater installation 1 so that this installation can retain a rather large (greater) amount of water on inflow side 11 with the aid of its damming element 3 before this water must be discharged into, e.g., a natural body of water.

The impurities of the water that accumulate in waste-water installation 1 and pass with the rainwater and the waste water mixed with it into the area of inflow side 11 are retained in a known manner by cleaning device 2 when the water in wastewater installation 1 passes from inflow side 11 directly to outflow side 12. Cleaning device 2 is designed as sieve rake 22 and consists substantially of rake rods arranged superposed horizontally, e.g., with a slot width between the rake rods of 3 mm to 11 mm. Sieve rake 22 comprises rake cleaner 24 for keeping the intermediate spaces between the individual rake rods free from the dirt particles pressed on the inflow side of the rake in the area of the rake rods by the flow of the liquid. This rake cleaner is designed to be movable and is arranged on the side of sieve rake 22 facing outflow side 12.

Rake cleaner 24 travels for cleaning along sieve rake 22 and engages thereby with cleaning elements into the intermediate spaces between rake rods 23. The intermediate space between rake rods 22 is filled thereby with cleaning elements 22 of rake cleaner 24 so that dirt components located there, e.g., grains of sand, substantially aggravate the movement of the rake cleaner and can result in wear to the rake rods and especially to the cleaning elements of rake cleaner 24, depending of the hardness of the dirt components. This is especially critical in the area of the components of cleaning device 2 located in the vicinity of bottom area 15. Suspended particles settle with preference on the latter, especially when the water level on inflow side 11 is only slightly higher than level N1 up to a water level in the range of N2, since up to that point no flow can take place in the area between damming element 3 and cleaning device 2. Moving rake cleaner 24 back and forth will then always stir up just enough of the sinking material that its damaging influence can be tolerated since it passes thereby into the range of the rake cleaner.

Figure 2:
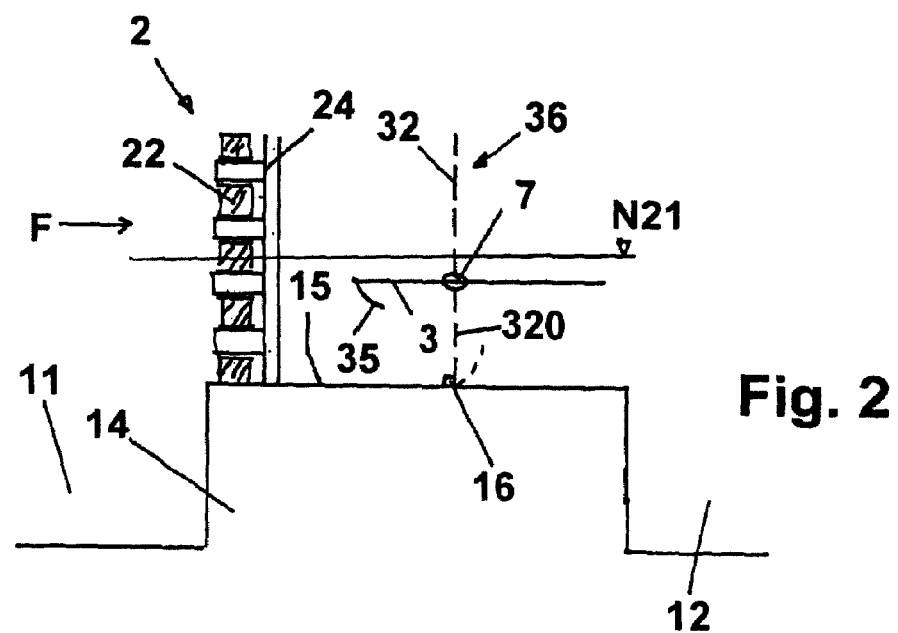
FIG. 2 shows a partial view similar to FIG. 1.

In addition to the positive effects of a waste-water installation 1 in accordance with the invention as shown in FIG. 1 with its damming element 3, the present invention has the further advantage that in the event of a heavy rain with a large accumulation of dirty water on inflow side 11, the flowthrough of the oncoming water through sieve rake 22 is distributed over its entire surface if, in such an event, damming element 3 frees the flowthrough, even if only partially as in the exemplary embodiment of FIG. 1, and to a particular extent if a damming element like the one shown in FIG. 2 is used. This brings it about that the liquid flowing through the rake is distributed over its entire height so that the passage rate is uniformly the same over the entire height of cleaning device 2. This achieves an especially advantageous action of cleaning device 2.

FIG. 2 shows a schematic view of a section through waste-water installation 1 similar to FIG. 1; however, only the area of the intermediate wall, bottom area 15 and a partial area of cleaning device 2 are shown. Sieve rake 22 arranged on intermediate wall 14, which rake is also associated with a rake cleaner 24, is followed by damming element 3 in flowthrough direction F. Damming element 3 is designed in the exemplary embodiment of FIG. 2 as damming flap 36 that can pivot about shaft 7. Damming flap 36 is shown in its position that it assumes when liquid flows in flowthrough direction F, that is, a state in which damming element 3 has changed following the damming pressure of the backed-up water from a closed position into a flowthrough position. The closed position of damming flap 36 is sketched with an interrupted line from which it is clear that damming element 3 consists in the exemplary design of FIG. 2 of two partial surfaces 32, 320 separated from one another by shaft 7. Partial surface 32 shown above shaft 7 has a greater height and therewith also greater surface than partial surface 320 arranged below shaft 7. This geometric shape has the effect that at a liquid level with level N21 the forces act on the two partial surfaces 32, 320 in such a manner that a torque acts around shaft 7 so that partial surface 320 located beneath shaft 7 is pressed away from sieve rake 22 and rests sealingly on stop 16 formed in the area of bottom area 15. If the liquid rises further, the force acting on upper partial surface 32 becomes greater and greater until it is capable of rotating damming flap 36 clockwise about shaft 7. As a result thereof, damming element 3 of FIG. 2 frees the flowthrough in a practically unhindered manner so that practically no more damming action is effected.

In order that damming flap 36 retains its open position, as shown in FIG. 2 with an uninterrupted line, in such an instance, even if the water level drops, the damming flap comprises guide device 35 on its partial surface arranged below shaft 7 which guide device directs the force of the liquid flowing by in such a manner onto damming flap 36 that the latter remains in the open position even if the liquid level has already dropped down to approximately the level of shaft 7.

Figure 3:
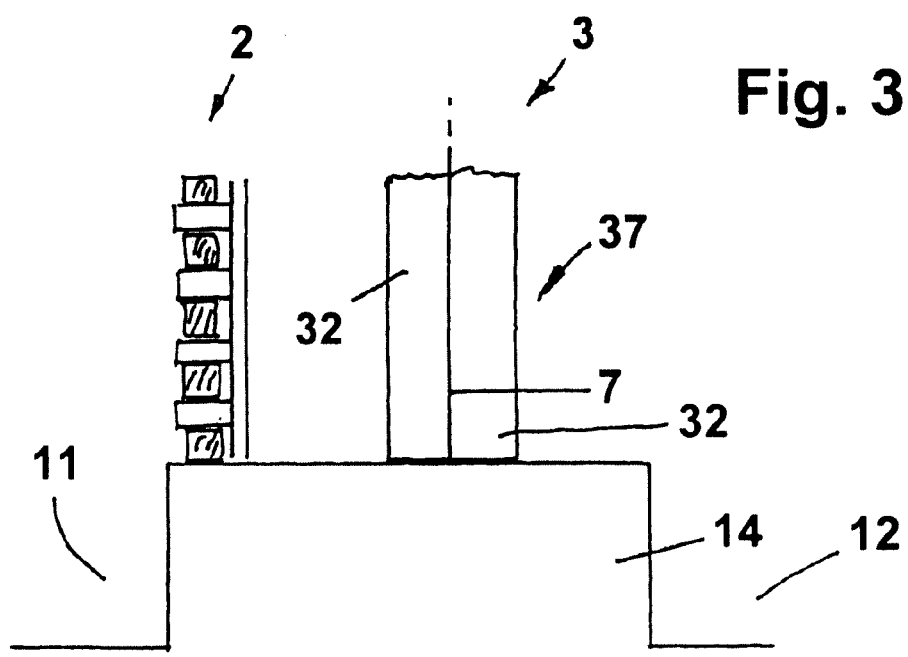
FIG. 3 shows a view similar to FIG. 2 with a different damming element.

FIG. 3 shows a diagrammatic view similar to that of FIG. 2 but with a damming element 3 that consists of two partial surfaces 32, 320 pivotably mounted about horizontal shaft 7 running between them. In order to form an effective damming element, several of flap elements 37 shown in FIG. 3 are arranged along the back side of cleaning device 2. The individual flap elements forming damming element 3 comprise an articulating lever (not shown) with which they can be pivoted, e.g., via a control rod from the open position into the closed position. The drive energy necessary for this can be generated, e.g., by a suitable power transfer means via the backed-up water or via the flowing water. However, it is also advantageously possible in addition to move flap elements 37 from the open position into the closed position and vice versa via, e.g., a hydraulic system or an electromotor. This design of the damming element has the advantage that only relatively low forces are required to move the flap elements, independently of the water level.

Figure 4:
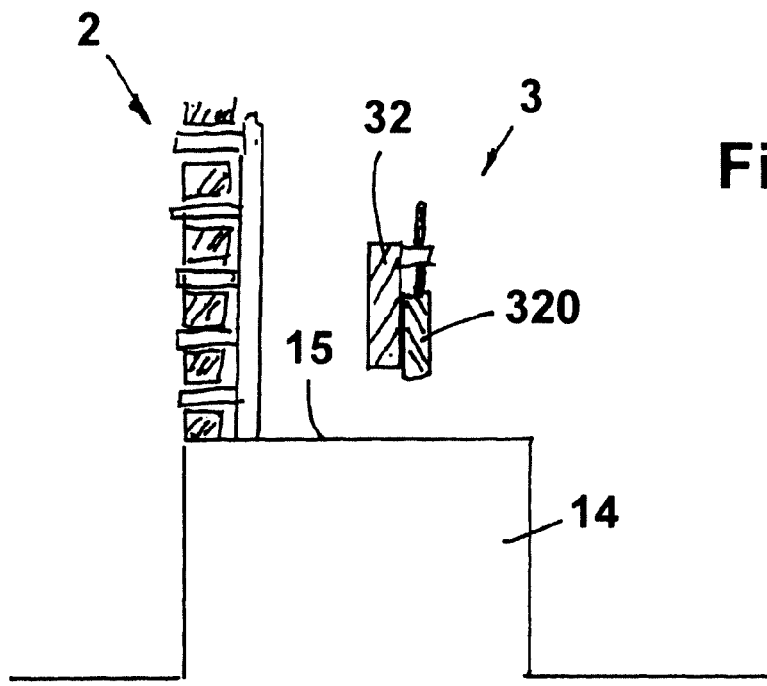
FIG. 4 shows a sectional view of a shiftably supported damming element.

FIG. 4 shows another advantageous exemplary embodiment of the present invention in which a multi-part damming element 3 is also arranged in the direction of the flowthrough of the water behind cleaning device 2. Damming element 3 consists of partial surface 32 installed in a fixed manner in waste-water installation 1 and of partial surface 320 also movably arranged transversely to the direction of flowthrough of the flowing medium. In the exemplary embodiment of FIG. 4, movably arranged partial surface 320 is arranged on partial surface 32 in a fixed manner in waste-water installation 1 on the side facing away from cleaning device 2. An arrangement of movable partial surface 320 in the direction of flow in front or after the fixed part of damming element 3 makes no difference in principle but rather is a function of the practical situation such as, e.g., sliding surfaces and guide surfaces for movable partial surface 320. Just as in the case of damming element 3 in the exemplary embodiment of FIG. 3, a drive device operating with outside energy should preferably be provided for shifting movable partial surface 320. However, it is also conceivable to perform the opening and closing of movable partial surface 320 via the backed-up or flowing water with the aid of suitable means, e.g., floats or baffles.

In addition to an embodiment of the invention like the one shown in FIG. 4, it is also conceivable to arrange the entire damming element 3 movably in the waste-water installation so that the flowthrough of water below the damming element is released by a shift in the vertical direction. Such a design makes it possible not only to realize a small slot or interval between damming element 3 and bottom area 15 that is especially suited for generating high flow rates in the area of bottom area 15 and therewith removing the deposited suspended material and sinking material in an especially reliable manner, but it is also additionally possible therewith to move the damming element vertically in such a manner that the entire surface of cleaning device 2 is freed for an unimpeded passage of the liquid. This mode of operation should particularly be provided if there is a danger that cleaning device 2 is inundated as a consequence of a large amount of accumulating water.

Figure 5:
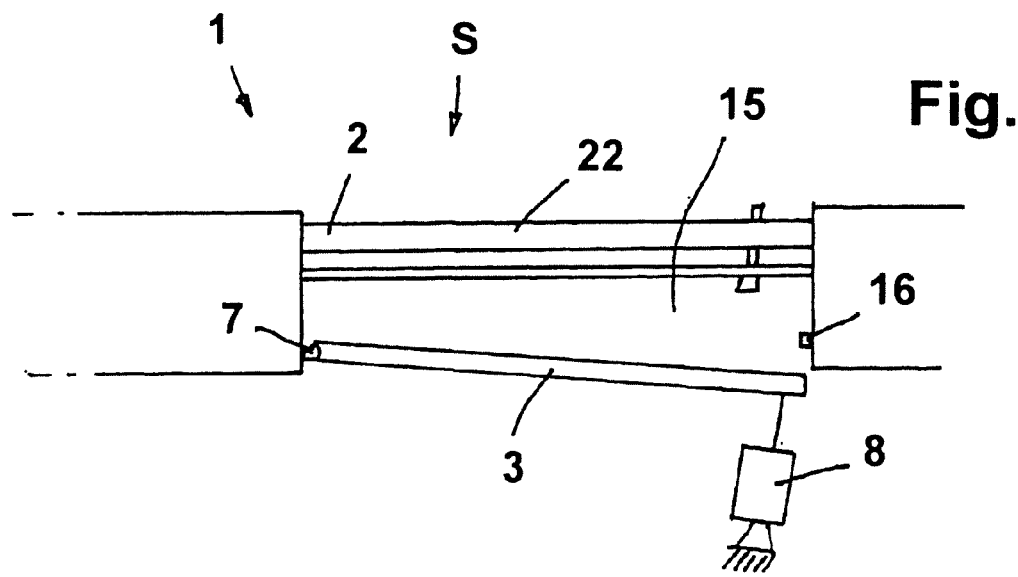
FIG. 5 shows a top view onto a cleaning device with a damming flap.

FIG. 5 shows another embodiment of the invention in which damming element 3 can be opened in a pivoting motion similar to a door about vertical shaft 7. FIG. 5 shows a top view of a diagrammatic view of a cleaning device 2 built into the wall of a waste-water installation 1. Damming element 3 frees the passage of the water in the area of bottom area 15 in that it is pivoted substantially in the direction of flow S away from cleaning device 2. The pivoting takes place via drive device 8 that can be designed, e.g., as a hydraulic piston. This embodiment of a movable damming element 3 in accordance with the invention has the advantage that damming element 3 can be moved away rapidly and in a simple manner, e.g., for maintenance, so that sieve rake 22 is readily accessible from both sides.

Figure 6:
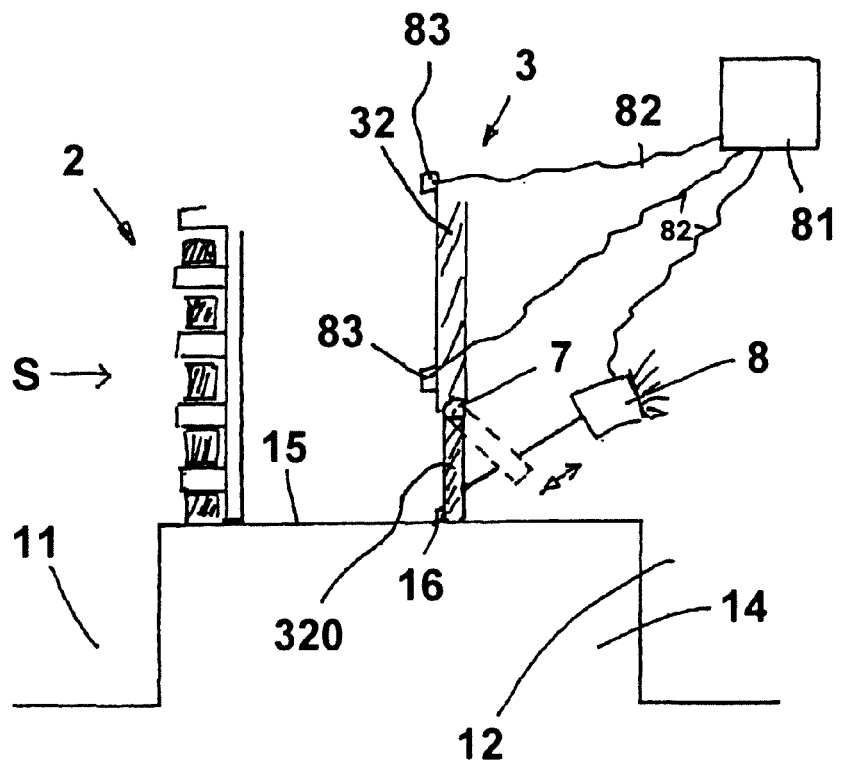
FIG. 6 shows a diagrammatic view similar to FIG. 1 with a control device.

FIG. 6 shows a section of a diagrammatic view similar to that of FIG. 1. Damming element 3 is divided into partial surface 32 installed in a fixed manner and into movable partial surface 320. Damming element 3 is also arranged in the direction of flow S behind cleaning device 2. Movable partial surface 320 of damming element 3 closes off the area between bottom area 15 and stationary partial surface 32 of damming element 3 in its closed position. To this end movable partial surface 320 is loaded by drive device 8 that presses movable partial surface 320 onto bottom area 15 so that a seal is created. It is provided for opening and closing movable partial surface 320 that drive device 8 is supplied via control device 81 with control signals and driving energy. Control device 81 is connected via control leads 82 to sensors 83 with whose aid the level of the liquid in front of damming element 3 can be measured. The measuring takes place in a known manner, e.g., by measuring the pressure or optically. It is therefore possible with the aid of this advantageous design of the invention to open or close movable partial surface 320 as a function of the level of the backed-up water.

In addition, an opening and closing of damming element 3 can be regulated with the aid of control device 81 as a function of time intervals. This makes it possible to assure at regular intervals that bottom area 15 and therewith cleaning device 2 and its rake cleaner are regularly rinsed and washed in such a manner that deposited sinking material is removed from their area. It is, of course, a prerequisite for this that the amount of water in inflow side 11 has reached a sufficient dammed height (level) that a flow of water over bottom area 15 is possible at all. It is, of course, also possible to combine a sensor control and a time control or to make a cleaning of bottom area 15 possible by a manual intervention.

Figure 7:
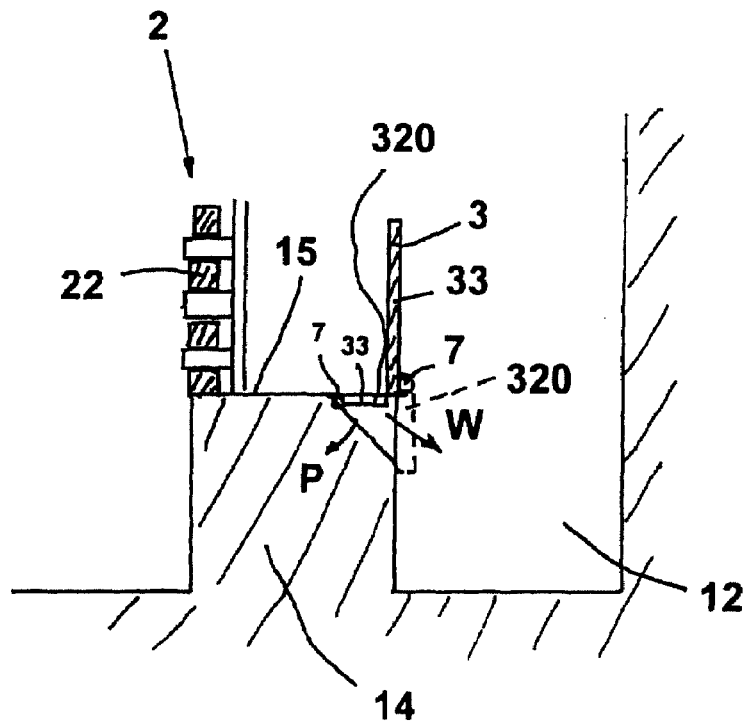
FIG. 7 shows a diagrammatic view similar to FIG. 1 with a damming element whose shaft runs in the bottom area.

FIG. 7 shows a diagrammatic view of a waste-water installation in accordance with the invention similar to that of FIG. 1. In the waste-water installation of FIG. 7, damming element 3 is also designed in a multi-part manner in which damming element 3 consists of two separate structural components 33 of which one, the pivotably mounted one, is arranged in the plane of bottom area 15 so that it can pivot about shaft 7. The movable partial surface 320 is designed so that in its closed state it rests practically in a plane with bottom area 15. As the dammed pressure of the water backing up on damming element 3 increases, movable partial surface 320 of damming element 3 begins to pivot in the direction of arrow P downward about shaft 7 and opens the flowthrough of the water underneath the stationary partial surface of damming element 3 in the direction of arrow W. In its closed position, movable partial surface 320 is held by elastic elements (not shown). The pressure force of the elastic elements is overcome by a certain dammed level of the water in front of damming element 3 so that the flowthrough takes place in the direction of arrow W. Intermediate wall 14 is designed in a corresponding manner so that it can receive movable partial surface 320.

Another embodiment is shown with an interrupted line in which movable partial surface 320 is arranged substantially below bottom area 15 even though its shaft 7 also runs substantially at the level of bottom area 15.

Figure 8:
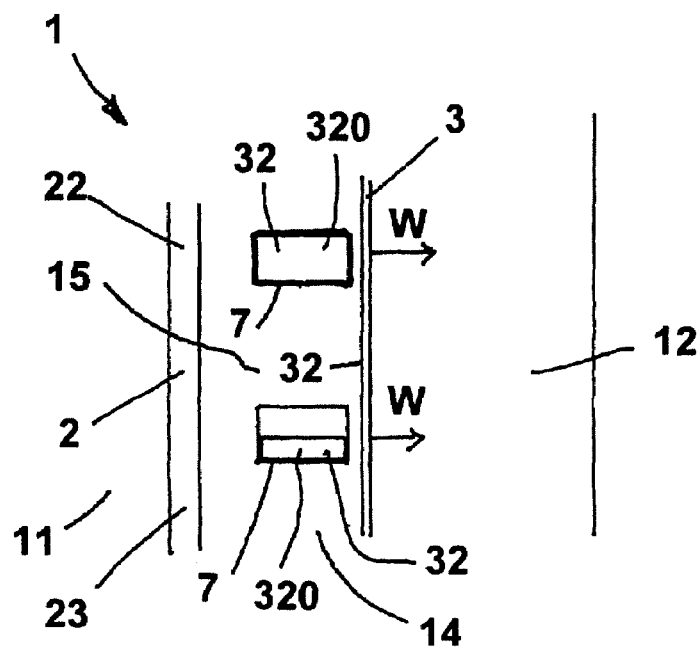
FIG. 8 shows a top view onto the bottom area with the movable parts of the damming element arranged in it.

FIG. 8 shows a section of a device 1 in accordance with the invention in a top view onto bottom area 15 with movable partial surfaces 320 of damming element 3 arranged in it, which damming element consists of several partial surfaces 32. The uppermost rake rod 23 of sieve rake 22 can be recognized in the top view as well as the top view onto movable partial surfaces 320 of damming element 3, whose top view is represented by two parallel lines. The top view onto outflow side 12 is recognizable to the right of damming element 3. Movable partial surface 320 shown above is presented in its closed position whereas the movable partial surface 320 shown below is pivoted about shaft 7 so that it is shown in its half-open position. Intermediate wall 14 is provided in a manner similar to that in FIG. 7 with a perforation through which the water passes in the direction of arrow W into outflow side 12 of waste-water installation 1. As is clear from FIG. 8, especially on the movable partial surface 320 shown at the bottom, shaft 7 is arranged substantially vertically relative to cleaning device 2.

In addition to the cited embodiment, other cleaning devices that are not based on a principle of a sieve rake can be used just as well in a waste-water installation in accordance with the invention. The invention makes it possible, independently of the embodiment of the individual elements, to intervene in a waste-water installation in such a manner that the disadvantages of the state of the art are avoided by making possible a flowthrough of water from inflow side 11 to outflow side 12.

It should be appreciated by those skilled in the art that modifications and variations can be made to the embodiments of the invention described or illustrated herein without departing from the scope and spirit of the invention as set forth in the appended claims and their equivalents.

The invention claimed is:

1. A waste-water installation having an inflow side for contaminated water and an outflow side for cleaned water, the inflow and outflow sides separated by a wall member, said installation comprising:
    a cleaning device extending from and vertically above the wall member and between said inflow side and said outflow side to remove impurities from water flowing from said inflow side to said outflow side;
    a damming element disposed downstream of said cleaning device in a direction of flow of water cleaned by the cleaning device and flowing from the cleaning device to the outflow side; and
    wherein said damming element comprises a non-movable damming component and a movable damming component, at least a first portion of said non-movable damming component being disposed above said movable damming component and above the wall member, said movable damming component being configured to move automatically from a closed position to an open position by the pressure of water upstream of said damming element rising to a predetermined level above said movable damming component such that a flowthrough is established for water cleaned by said cleaning device to flow beneath said first portion of said non-movable damming component.

2. The installation as in claim 1, wherein said movable component comprises an elastically deformable member.

3. The installation as in claim 1, wherein said movable component comprises a flap member.

4. The installation as in claim 3, wherein said flap member is pivotally mounted relative to a pivot axis.

5. The installation as in claim 4, wherein said pivot axis is defined by a pivot shaft disposed generally horizontal to and spaced vertically above said bottom area.

6. The installation as in claim 1, wherein said movable component and said non-movable component are arranged in a generally common plane.

7. The installation as in claim 6, wherein said movable component and said non-movable component are separated by a shaft about which said movable component pivots.

8. The installation as in claim 7, wherein said shaft is vertically disposed.

9. The installation as in claim 1, wherein said movable component and said non-movable component are arranged in generally offset planes.

10. The installation as in claim 9, wherein said movable component is movable in a generally vertical plane offset from a plane of said non-movable component.

11. The installation as in claim 1, wherein said damming element is spaced at an interval downstream from said cleaning device.

12. The installation as in claim 11, wherein said movable component is movable into said interval upon moving from said closed position to said open position.

13. The installation as in claim 11, wherein said interval defines a collection area for sinking material from the water flowing through said cleaning device.

14. The installation as in claim 1, wherein said movable component is pivotally mounted and further comprises a guide element configured thereon such that said guide element is contacted by water flowing beneath said movable component to retain said movable component in said open position.

15. The installation as in claim 1, wherein said movable component is movable in a plane of said bottom area.

16. The installation as in claim 15, wherein said movable component is pivotally mounted.

17. The installation as in claim 16, wherein said movable component pivots to an open position below a plane of said bottom area.

* * * * *